United States Patent
Funaki

(10) Patent No.: US 7,199,298 B2
(45) Date of Patent: Apr. 3, 2007

(54) APPARATUS, METHOD AND COMPUTER PROGRAM FOR CONTROLLING MUSIC SCORE DISPLAY TO MEET USER'S MUSICAL SKILL

(75) Inventor: Tomoyuki Funaki, Hamamatsu (JP)

(73) Assignee: Yamaha Corporation (JP)

( * ) Notice: Subject to any disclaimer, the term of this patent is extended or adjusted under 35 U.S.C. 154(b) by 264 days.

(21) Appl. No.: 10/384,980

(22) Filed: Mar. 10, 2003

(65) Prior Publication Data

US 2003/0167903 A1 Sep. 11, 2003

(30) Foreign Application Priority Data

Mar. 8, 2002 (JP) .............................. 2002-063060
Oct. 18, 2002 (JP) .............................. 2002-303949

(51) Int. Cl.
G09B 15/00 (2006.01)
G09B 15/02 (2006.01)
G10H 1/00 (2006.01)

(52) U.S. Cl. ................. 84/477 R; 84/470 R; 84/483.1; 84/483.2; 84/DIG. 6

(58) Field of Classification Search .......... 84/600–602, 84/609, 615–616, 649, 653–654, 470 R, 84/477 R, 478, 483.1, 483.2, 484, 485 R, 84/DIG. 6

See application file for complete search history.

(56) References Cited

U.S. PATENT DOCUMENTS

| | | | |
|---|---|---|---|
| 5,315,911 A | | 5/1994 | Ochi |
| 5,533,903 A | * | 7/1996 | Kennedy ................ 434/307 R |
| 5,540,132 A | * | 7/1996 | Hale ......................... 84/470 R |
| 5,597,968 A | | 1/1997 | Okamoto |
| 5,690,496 A | * | 11/1997 | Kennedy ................. 434/307 R |
| 6,211,451 B1 | * | 4/2001 | Tohgi et al. .............. 84/470 R |
| 6,346,666 B1 | * | 2/2002 | Tsai et al. ..................... 84/637 |
| 6,438,579 B1 | * | 8/2002 | Hosken ....................... 709/203 |
| 2003/0021441 A1 | * | 1/2003 | Levy et al. .................. 382/100 |
| 2003/0167904 A1 | * | 9/2003 | Itoh ............................ 84/609 |
| 2004/0040433 A1 | * | 3/2004 | Errico ...................... 84/477 R |
| 2004/0173082 A1 | * | 9/2004 | Bancroft et al. ............ 84/612 |

FOREIGN PATENT DOCUMENTS

| | | |
|---|---|---|
| DE | 44 24 199 A 1 | 1/1995 |
| JP | 2001-154665 A | 6/2001 |
| JP | 2002-059227 * | 3/2002 |

OTHER PUBLICATIONS

Office Action issued in the corresponding European patent application, dated Jun. 13, 2005 (5 pages).

* cited by examiner

Primary Examiner—Marlon Fletcher
(74) Attorney, Agent, or Firm—Rossi, Kimms & McDowell LLP

(57) ABSTRACT

Based on music performance data, music score display data are composed for displaying a music score representing the music performance. A user inputs his/her musical skill to the apparatus. Referring to a musical skill level versus music score item correspondence table, music score items to be exhibited in the music score are determined to meet the musical skill as inputted by the user, and are included in the composed music score display data. Thus, a music score containing assisting as well as necessary detailed musical signs and indications which meet the user's musical skill will be displayed in addition to the main musical notation of the note progression.

10 Claims, 11 Drawing Sheets

Hardware Configuration

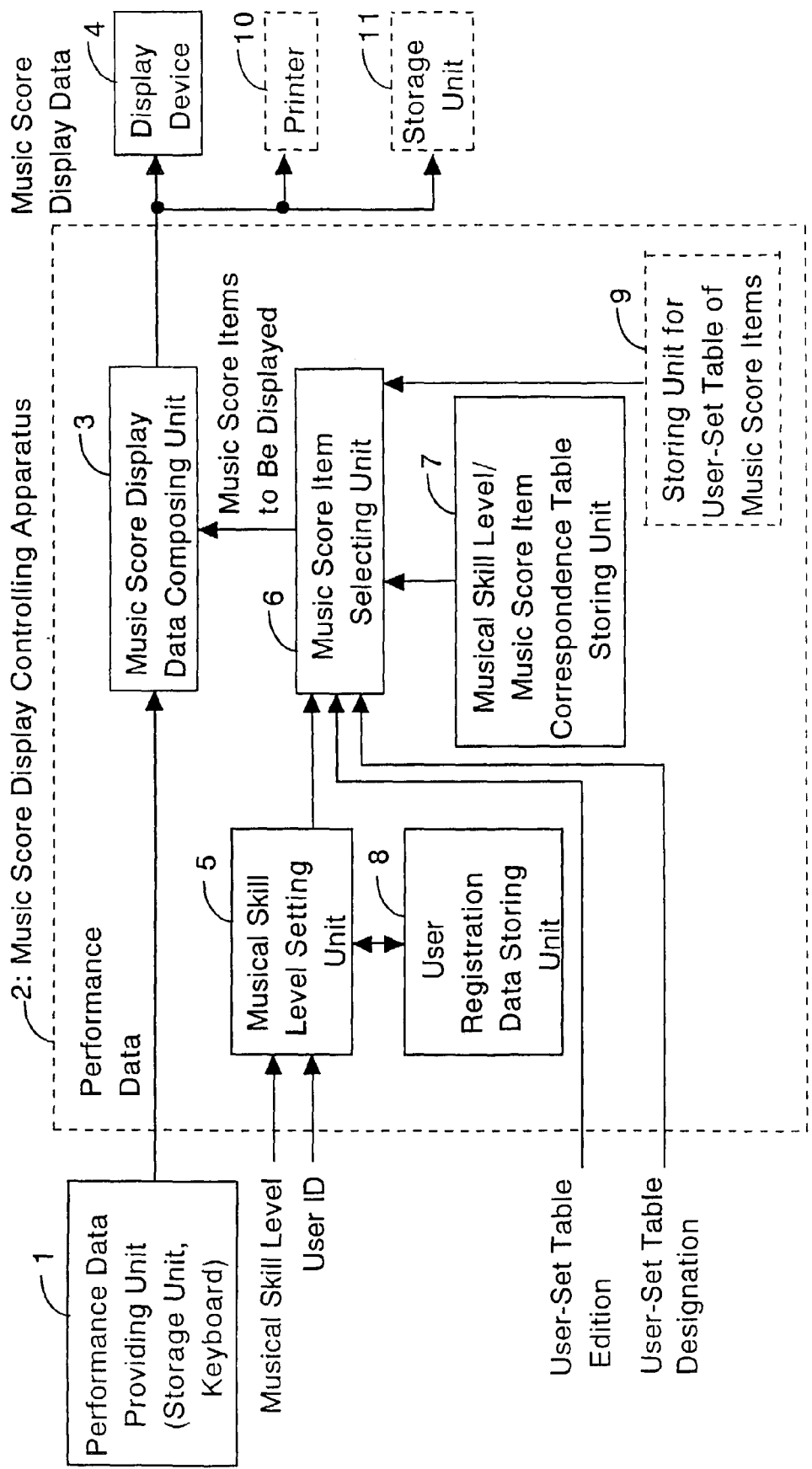
Fig. 1  Functional Configuration

*Fig.2* Musical Skill Level/Music Score Item Correspondence Table

| Musical Skill | Chord | Dynamics | Fingering | Pedaling | Note Naming |
|---|---|---|---|---|---|
| A (highest) | ○ | × | × | × | × |
| B | ○ | × | × | ○ | × |
| C | × | ○ | ○ | ○ | ○ |
| D | × | ○ | ○ | × | ○ |
| E (lowest) | × | × | ○ | × | ○ |

*Fig.3a* Music Score with Displayed Items
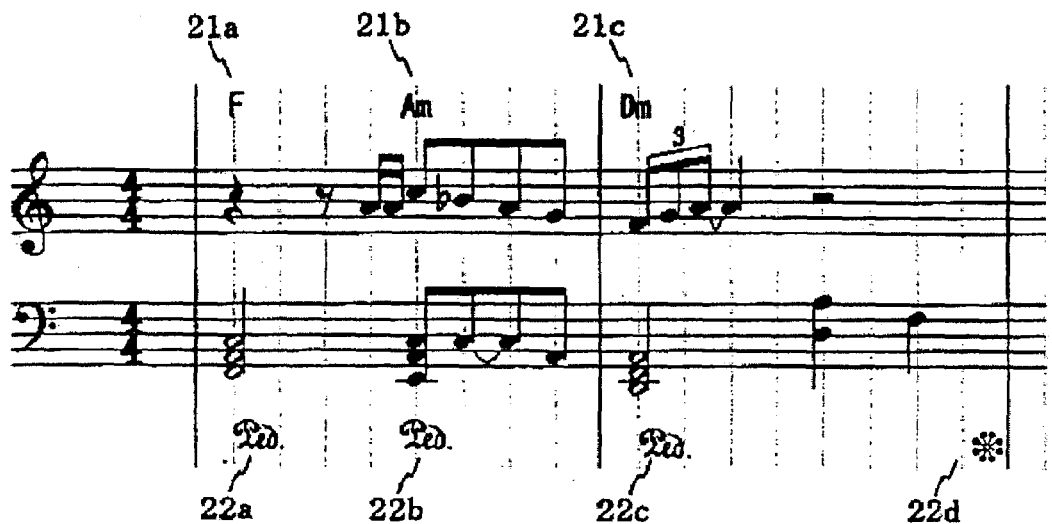
*Fig.3b* Music Score with Displayed Items
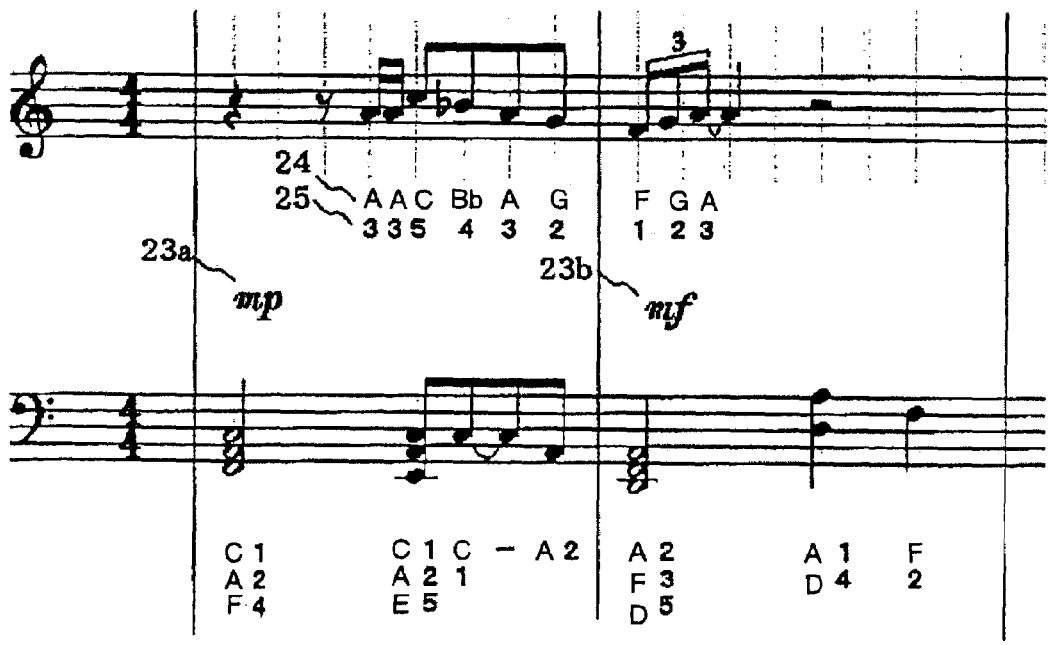

*Fig.4a*  Musical Skill Level/Music Score Item Correspondence Table

| Music Playing Skill | Dynamics | Fingering | Pedaling |
|---|---|---|---|
| A (highest) | × | × | × |
| B | × | × | ○ |
| C | ○ | ○ | ○ |
| D | ○ | ○ | × |
| E (lowest) | × | ○ | × |

*Fig.4b*  Musical Skill Level/Music Score Item Correspondence Table

| Score Reading Skill | Note Naming |
|---|---|
| A (highest) | × |
| B | × |
| C | ○ |
| D | ○ |
| E (lowest) | ○ |

*Fig.4c*  Musical Skill Level/Music Score Item Correspondence Table

| Arranging Skill | Chord |
|---|---|
| A (highest) | ○ |
| B | ○ |
| C | × |
| D | × |
| E (lowest) | × |

Fig.5a  User-Set Table (Default)

| Musical Skill | Chord | Dynamics | Fingering | Pedaling | Note Naming |
|---|---|---|---|---|---|
| A (highest) | ○ | × | × | × | × |
| B | ○ | × | × | ○ | × |
| C | × | ○ | ○ | ○ | ○ |
| D | × | ○ | ○ | × | ○ |
| E (lowest) | × | × | ○ | × | ○ |

Fig.5b  User-Set Table (Example 1)

| Musical Skill | Chord | Dynamics | Fingering | Pedaling | Note Naming |
|---|---|---|---|---|---|
| A (highest) | * | * | * | * | * |
| B | * | * | * | * | * |
| C | * | * | * | * | * |
| D | * | * | * | * | * |
| E (lowest) | ○ | * | * | * | × |

Fig.5c  User-Set Table (Example 2)

| Musical Skill | Chord | Dynamics | Fingering | Pedaling | Note Naming |
|---|---|---|---|---|---|
| E (lowest) | ○ | * | * | * | × |

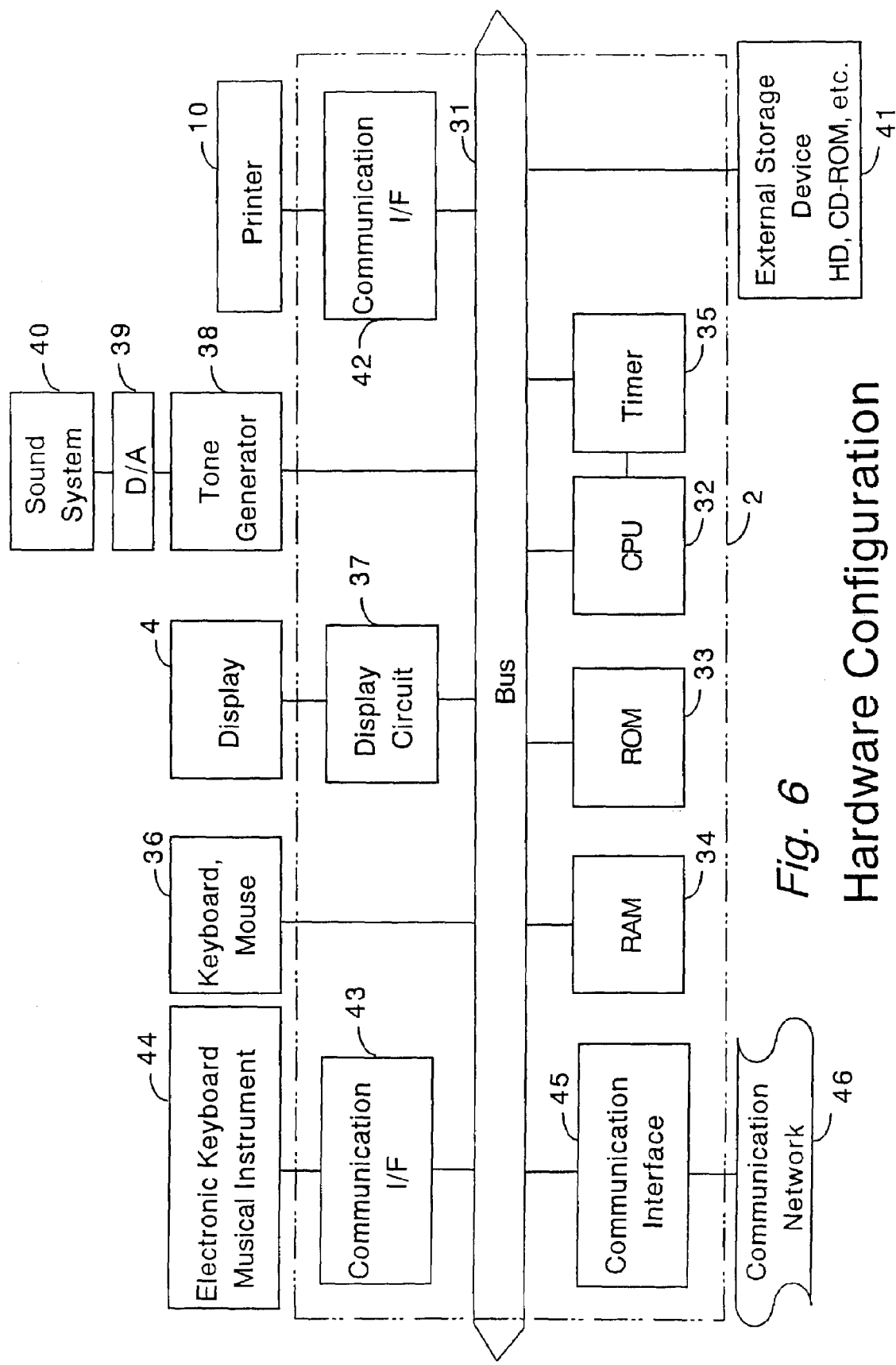
Fig. 6  Hardware Configuration

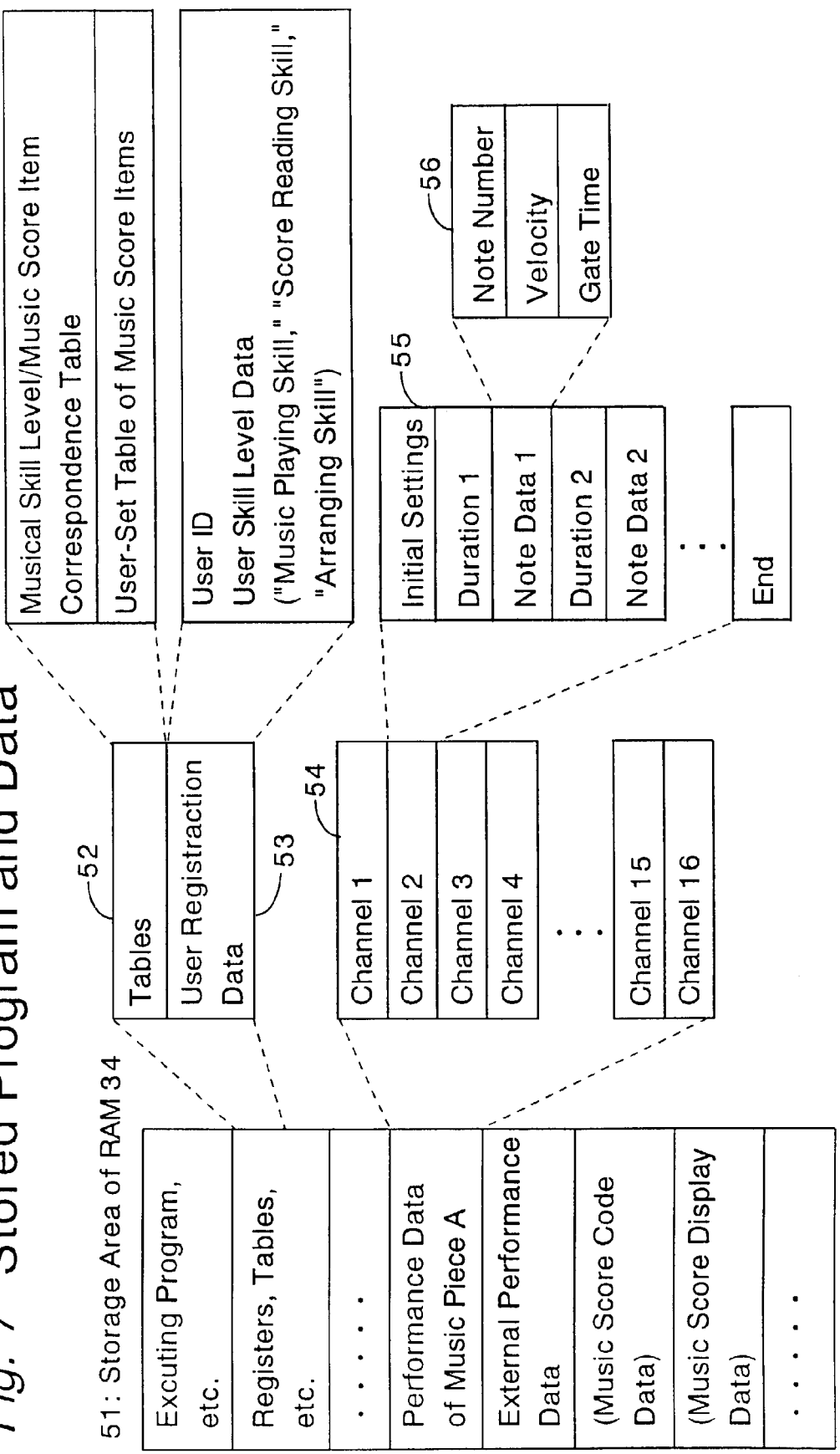
Fig. 7 Stored Program and Data

Fig. 8a Overall Flow of Music Score Display Control (1)
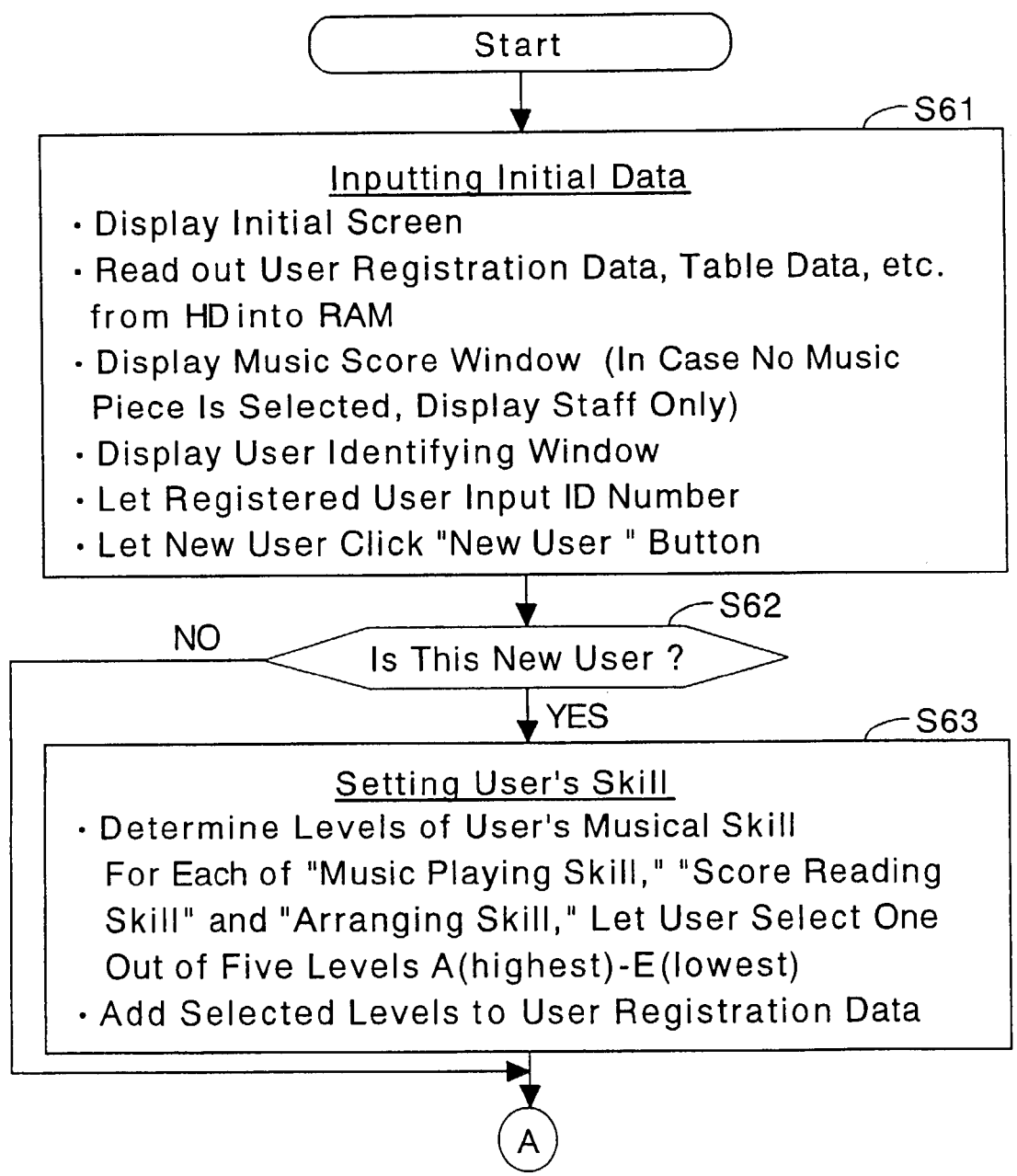

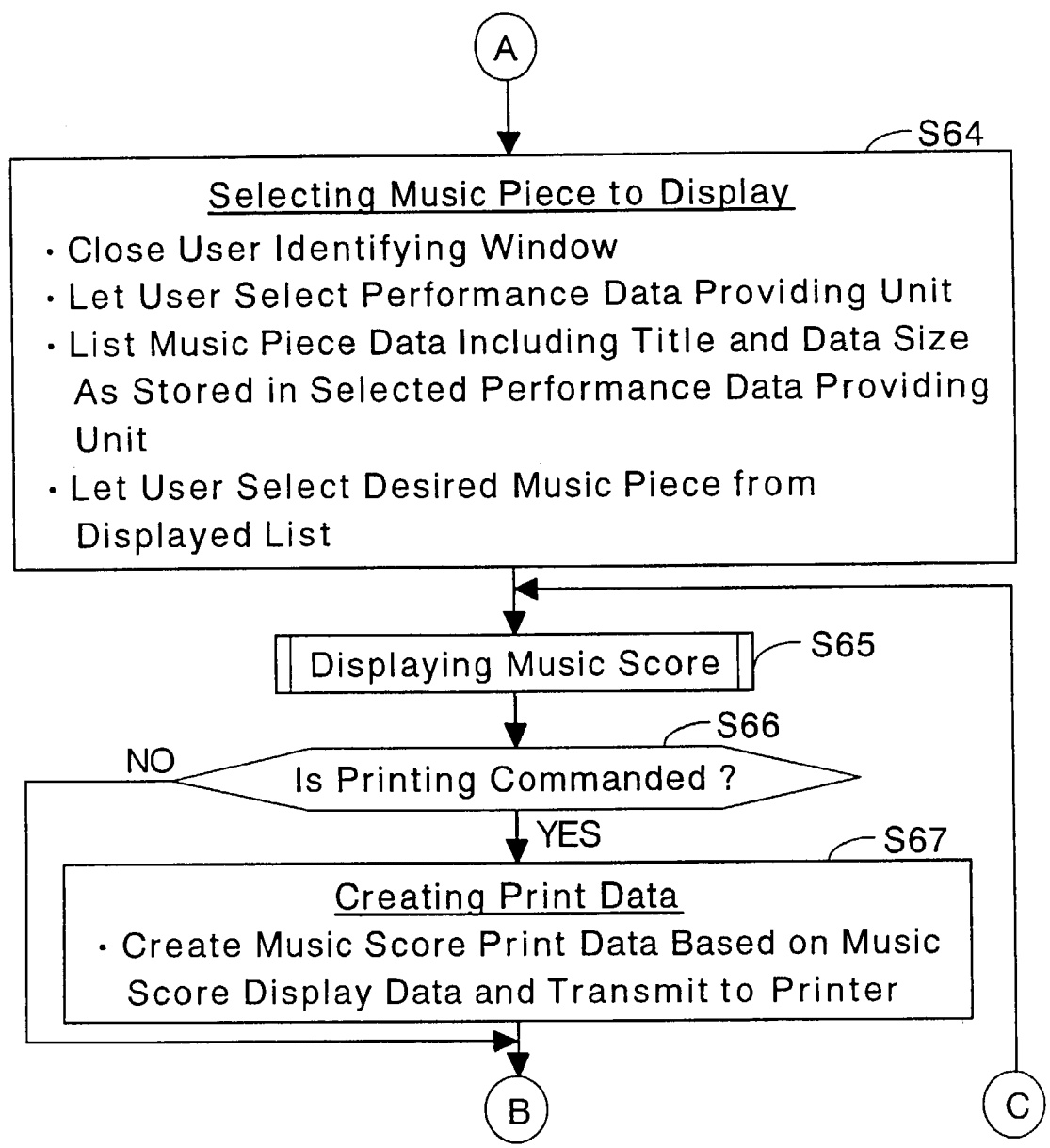
Fig. 8b Overall Flow of Music Score Display Control (2)

*Fig. 8c* Overall Flow of Music Score Display Control (3)
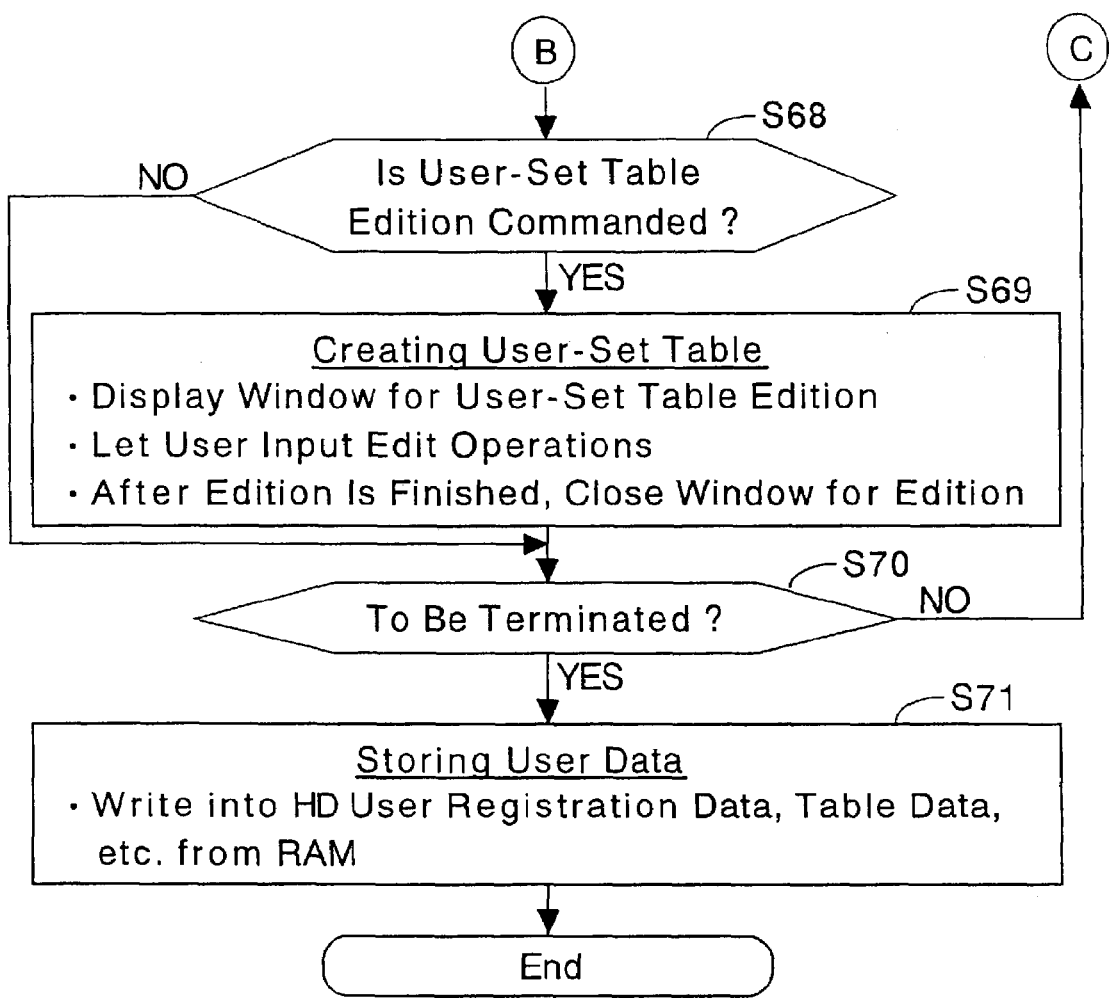

*Fig. 9* Subroutine Flow for Displaying Music Score
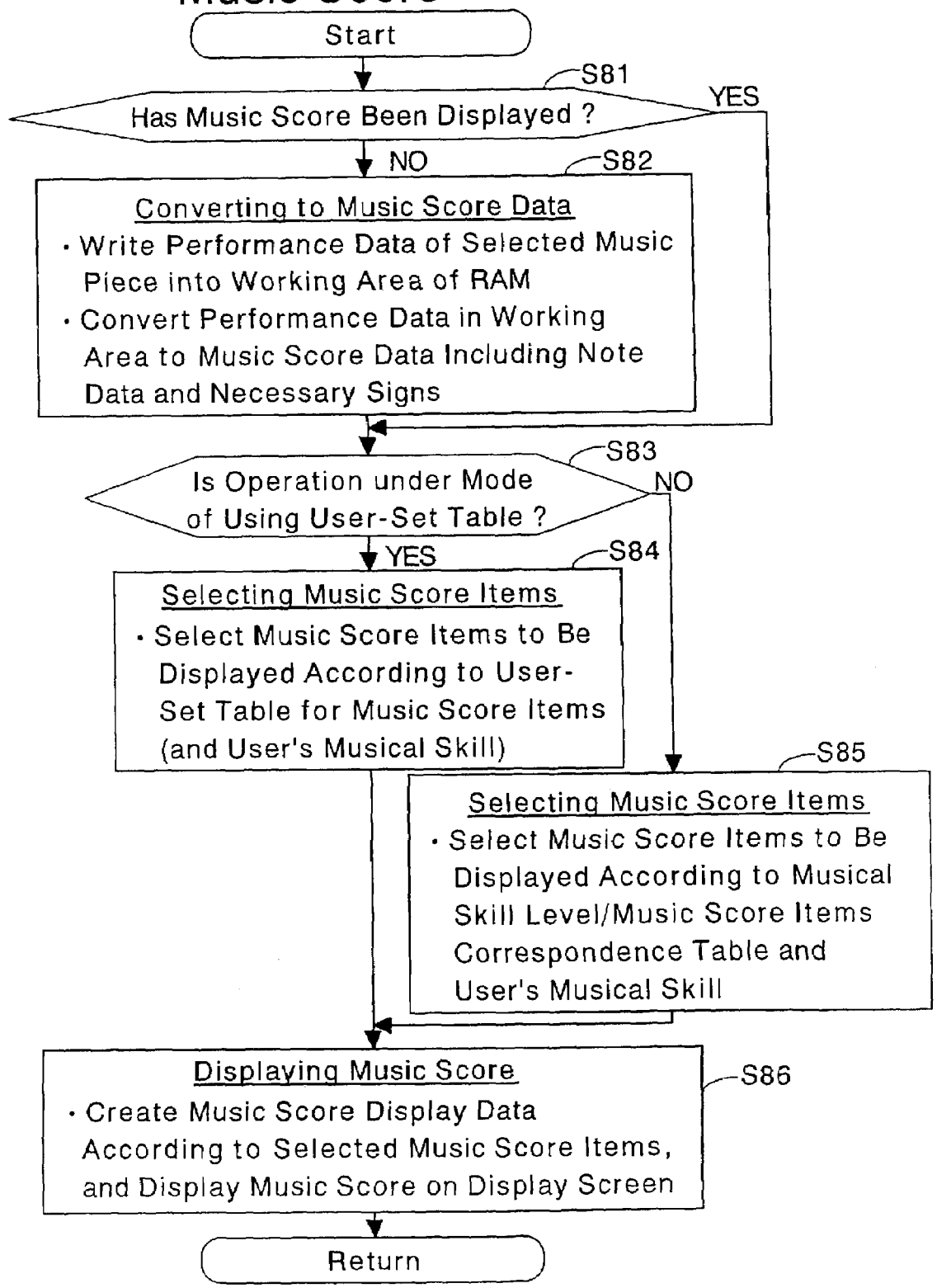

APPARATUS, METHOD AND COMPUTER PROGRAM FOR CONTROLLING MUSIC SCORE DISPLAY TO MEET USER'S MUSICAL SKILL

BACKGROUND OF THE INVENTION

1. Field of the Invention

The present invention relates to an apparatus and a method for controlling music score display based on music data, and a computer program for realizing such an apparatus and a method using a computer system, and more particularly to an apparatus and a method in which a music score is displayed on a display device with signs and indications which meet the musical skill level of a user. A musical score may not only be displayed on a display screen, but may also be printed on a sheet, or recorded in recording means for a later display or print.

2. Description of the Prior Art

In the field of electronic musical apparatuses, there are such apparatuses and application programs which realize the display of a music score on a display screen or on a sheet of paper based on the MIDI music data, i.e. by converting the MIDI music data to music score display data. In the conventional apparatuses, however, the signs and indications to be exhibited on the music score are predetermined for the respective types of models, and the contents to be contained in a displayed music score may not be arbitrarily selected or changed according to the musical skill level or the preference of the user. Consequently, a novice or beginner will be confronted with a music score containing musical signs and indications beyond his/her musical skill or will be compelled to read a music score not containing assisting signs such as note names and fingering numbers. Such music scores may give him/her an impression of being beyond his/her skill and spoil his/her zest in trying to play the music on the score. On the other hand, an expert or advanced player will be confronted with a music score not containing necessary detailed musical signs and indications for sophisticated playing techniques or will see a music score containing unnecessary annoying indications such as note names and fingering numbers.

SUMMARY OF THE INVENTION

It is, therefore, a primary object of the present invention to solve the above described drawbacks with the conventional apparatus and to provide a novel type of apparatus and a method for controlling music score display, and a computer program for realizing such an apparatus and a method using a computer system, in which the signs and indications to be exhibited on a displayed music score may be selectively determined to meet the musical skill level of a user.

According to the present invention, the object is accomplished by providing a music score display controlling apparatus for composing music score display data according to music performance data comprising: a music data providing module which provides music data representing a music performance; a musical skill level input module for inputting a user's musical skill level; and a music score display data composing module which composes music score display data based on the provided music data to display a music score representing the music performance, the music score display data containing data for exhibiting musical signs and indications of music score item categories which meet the user's musical skill level when included in the displayed music score.

In an aspect of the present invention, the music score display data composing module includes a music score item determining unit which selectively determines the music score item categories of musical signs and indications to be exhibited on a displayed music score according to the inputted user's musical skill level, and controls the music score display data composing module to compose the music score display data containing data for exhibiting musical signs and indications of the determined music score item categories which meet the user's musical skill level when the music score is displayed. According to the present invention, the music skill levels may be the level of at least one of a music playing skill, a music score reading skill and an music arranging skill. Then, the musical skill level can be more specifically selected by the user.

According to the present invention, the object is further accomplished by providing a music score display controlling apparatus comprising: a first table storing device which stores a first table containing data of music score item categories to be exhibited on a music score with respect to musical skill levels; a musical skill level setting device for setting the musical skill level of a user; a music score item determining device which selectively determines music score item categories of musical signs and indications to be exhibited on a displayed music score by reading the music score item categories from the first table storing device according to the set musical skill level of the user; and a music score display data composing device which receives music performance data, composes music score display data based on the inputted music performance data containing data for exhibiting musical signs and indications of the music score item categories as determined by the music score item determining device, and outputs the composed music score display data. With the table containing data of music score item categories to be exhibited on a music score with respect to musical skill levels, the musical signs and instructions will be easily determined in response to an input of the user's musical skill level. The table may be provided as a ROM and also may be read out and transferred to a working area in a RAM upon start of the computer system. The display data may not necessarily be supplied directly to the display device, but may be stored in a storage device in the shape of a data file for a later use.

In another aspect of the present invention, a music score display controlling apparatus further comprises a user registration data storing device; and wherein the music skill level setting device includes a user identifying device for identifying a user, and when the user is identified as being a new user, the music skill level setting device let the new user input the musical skill level of the new user, sets the inputted musical skill level of the new user, and stores the identification of the new user and the set musical skill level in the user registration data storing device, and when the user is identified as being an already registered user, the music skill level setting device reads out the musical skill level of the registered user from the user registration data storing device and sets the read-out musical skill level. Thus, once a user registers his/her musical skill level, the user will only have to identify himself/herself and the music score display with signs and instructions which will meet the user will be obtained without inputting his/her musical skill level, every time the user starts operating the apparatus.

In still another aspect of the present invention, a music score display controlling apparatus further comprises a second table storing device for storing a second table to contain data of music score item categories to be exhibited on a music score with respect to the user; and wherein the music score item determining device is to input music score item categories of musical signs and indications to be exhibited in the displayed music score with respect to the user and store the inputted music score item categories into the second table storing device, and to read out the stored music score item categories with respect to the user, thereby determining the music score item categories of musical signs and indications to be exhibited in the displayed music score.

According to the present invention, the object is still further accomplished by providing a music score printing controlling apparatus comprising: a first table storing device which stores a first table containing data of music score item categories to be printed in a music score with respect to musical skill levels; a musical skill level setting device for setting the musical skill level of a user; a music score item determining device which selectively determines music score item categories of musical signs and indications to be exhibited in a printed music score by reading the music score item categories from the first table storing device according to the set musical skill level of the user; and a music score printing data composing device which receives music performance data, composes music score printing data based on the received music performance data containing data for printing musical signs and indications of the music score item categories as determined by the music score item determining device, and outputs the composed music score printing data. The printing data may not necessarily be supplied directly to the printer, but may be stored in a storage device in the shape of a data file for a later printing.

According to the present invention, the object is still further accomplished by providing a method for controlling music score display according to music performance data, said method comprising: a step of providing music data representing a music performance; a step of inputting a user's musical skill level; and a step of composing music score display data based on said provided music data to display a music score representing said music performance, said music score display data containing data for exhibiting musical signs and indications of music score item categories which meet said user's musical skill level when included in said displayed music score.

According to the present invention, the object is still further accomplished by providing a computer program containing program instructions executable by a computer associated with a display device and causing said computer to execute: a process of providing music data which represent a music performance; a process of inputting a user's musical skill level; a process of composing music score display data based on said provided music data to display a music score representing said music performance, said music score display data containing data for exhibiting musical signs and indications of music score item categories which meet said user's musical skill level when included in said displayed music score; and a process of causing said display device to display a music score with said musical signs and instructions based on said composed music score display data.

As will be understood from the above description about the apparatus for controlling music score display, a sequence of the steps each performing the operational function of each of the structural elements of the above apparatuses will constitute a method for controlling music score display according to the spirit of the present invention.

As will be apparent from the description herein later, some of the structural element devices of the present invention are configured by a computer system performing the assigned functions according to the associated programs. They may of course be hardware structured discrete devices. Therefore, a hardware-structured device performing a certain function and a computer-configured arrangement performing the same function should be considered a same-named device or an equivalent to each other.

BRIEF DESCRIPTION OF THE DRAWINGS

For a better understanding of the present invention, and to show how the same may be practiced and will work, reference will now be made, by way of example, to the accompanying drawings, in which:

FIG. 1 is a block diagram illustrating the functional configuration of an embodiment of an apparatus for controlling music score display according to the present invention;

FIG. 2 is a chart showing an example of a table which lists the correspondence between musical skill levels and music score items to be displayed as stored in the musical skill level/music score item correspondence table storing unit 7 in FIG. 1;

FIGS. 3a and 3b are charts, each showing an example of a music score displayed according to a musical skill level;

FIGS. 4a, 4b and 4c are charts, each showing an example of a table which lists the correspondence between musical skill levels and music score items to be displayed as stored in the musical skill level/music score item correspondence table storing unit 7 in FIG. 1;

FIGS. 5a, 5b and 5c are charts, each showing an example of a user-set table which lists the correspondence between musical skill levels and music score items to be displayed as stored in the storing unit 9 for the user-set table of the music score items in FIG. 1;

FIG. 6 is a block diagram illustrating the hardware configuration of an embodiment of an apparatus for controlling music score display according the present invention;

FIG. 7 is a chart describing a program and data stored in the RAM 34 in FIG. 6;

FIGS. 8a, 8b and 8c, in combination, are a flow chart describing the overall flow of the music score display control processing according to an example of the present invention; and FIG. 9 is a flow chart describing in detail the subroutine processing for displaying a music score as conducted at the step S65 in FIG. 8.

DESCRIPTION OF THE PREFERRED EMBODIMENTS

Referring to the accompanying drawings, a preferred embodiment of the present invention will be described in detail hereinbelow. It should, however, be understood that the illustrated embodiment is intended just for a practical example and not for limiting the scope of the present invention, and that various modifications may be made without departing from the spirit of the present invention.

FIG. 1 is a block diagram illustrating the functional configuration of an embodiment of an apparatus for controlling music score display according to the present invention. In FIG. 1, a performance data providing unit 1 is to provide music performance data, and may be a storage unit storing such performance data, or a musical keyboard played by a user, or else, and outputs the performance data to a music score display controlling apparatus 2. The music score display controlling apparatus 2 of this embodiment comprises a music score display data composing unit 3, a musical skill level setting unit 5, a music score item selecting unit 6, a musical skill level versus music score item correspondence table storing unit 7, a user registration data storing unit 8 and a storing unit 9 for a user-set table of music score items. The music score display data composing unit 3 receives the music performance data and creates music score display data according to the received performance data to outputs the created music score display data to a display device 4 such as a CRT display device and LCD (liquid crystal display) device. The musical skill level setting unit 5 is to let the user input his/her musical skill level by means of a manipulating device such as a keyboard and switches, and sets the user's musical skill level to output the same to the music score item selecting unit 6.

The music score item selecting unit 6 refers to the musical skill level/music score item correspondence table in the storing unit 7 and selects music score item categories to be exhibited in a displayed music score according to the musical skill level as previously set in the musical skill level setting unit 5 to control the music score display data composing unit 3. The musical skill level/music score item corresponding table in the storing unit 7 is a table listing the music score description items such as chords, dynamics, fingering guides, pedaling signs and note name indications to be exhibited in the displayed music score with respect to the musical skill levels, as will be described in more detail hereinafter with reference to FIGS. 2 and 4a–4c. The musical skill levels may be ranked generally from a overall point of view, or may be ranked individually with respect to plural skills such as the skill in playing music, the skill in reading musical notations and the skill in arranging music. The music score item selecting unit 6 is to select the item categories of musical signs and symbols to be exhibited in the displayed music score with respect to the musical skill levels. The musical skill may be referred to individually among the classified skill categories or comprehensively in combination of the skill categories.

The music score display data composing unit 3 composes music score display data based on and in correspondence to the inputted music performance data including musical signs and instructions of the music score items selected by the music score item selecting unit 6 to be exhibited in a music score, and outputs the composed music score display data to the display device 4. Thus, the item categories of the musical signs and instructions are determined previously with respect to the user's musical skill levels, and a music score is displayed with the musical signs and instructions of the selected items in accordance with the inputted user's musical skill level, which realizes adequate display or presentation of a music score matching the user's musical skill.

According to the present invention, therefore, the contents of the music score to be displayed vary according to the musical skill level of the user, which was not the case with the conventional apparatus. More specifically, the music score display data composing unit 3, the music score item selecting unit 6 and the music score item selecting unit 7 of the music score display controlling apparatus 2 for composing music score data based on supplied music performance data of the present invention receive the performance data from the performance data providing unit 1 and musical skill level data from the musical skill level setting unit 5, and make reference to the musical skill level/music score item correspondence table in the storing unit 7, thereby composing music score display data based on the inputted music performance data by varying the items to be exhibited in a music score in accordance with the inputted user's musical skill level.

In order to selectively determine the items of musical signs and instructions to be exhibited according to the inputted user's musical skill level, it is not necessary to provide and use the musical skill level/music score item correspondence table storing unit 7, but may be by any other means as long as the correspondences between the musical skill levels and the music score items are provided. For example, the music score display control program may include plural process steps for designating music score items respectively adequate for the respective musical skill levels and include a judgment step for judging the inputted user's musical skill level to select the corresponding one of the such plural process steps for designating music score items which match the inputted particular musical skill level.

The music score display data composing unit 3 and the music score item selecting unit 6 may not necessarily be clearly separate units. For example, the music score display control program may include plural sub-programs for composing music score display data respectively matching the respective musical skill levels and include a judgment step for judging the inputted user's musical skill level to select the corresponding one sub-program for composing music score display data which match the inputted particular musical skill level. The abovementioned sub-programs for composing music score display data are programs respectively prepared with respect to the respective musical skill levels, each sub-program defining music score items to be exhibited and music score items not to be exhibited according to each musical skill, thus causing the display device 4 to display what should be displayed according to the musical skill of the individual user.

The music score display controlling apparatus 2 may preferably comprise the user registration data storing unit 8. Then, the musical skill level setting unit 5 identifies the user when the music score display controlling operation is started, and when the identified user is a new user, the apparatus requests the user to input the musical skill level, sets the musical skill level of the new user, outputs the same to the music score item selecting unit 6 and stores a new user ID and the musical skill level of the new user in the user registration data storing unit 8, and when the identified user is a registered user, the apparatus reads out the musical skill level of the registered user from the user registration data storing unit 8 and sets the read-out musical skill level in the musical skill level setting unit 5. The music score item selecting unit 6 refers to the musical skill level/music score item correspondence table storing unit 7 in accordance with the musical skill level of the new user or of the registered user, and reads out the applicable items to be exhibited on the music score.

The identification of the user is conducted by letting the user input his/her user ID number. The use of the user ID number will protect the privacy, i.e. the musical skill information of the individual user. A new user may be detected by judging whether the inputted user ID is a registered user ID, or may be confirmed by simply letting the user input the information as being a new user. If the music score display controlling apparatus 2 is to display different types of music scores respectively appropriate for the users with different musical skills, the apparatus may provide plural ID numbers and register the respective musical skills with respect to the respective ID numbers. In case the music score display controlling apparatus 2 is used by a single user at all, the user ID may not be requested in the operational flow, and the inputted musical skill levels may simply be stored in the user registration data storing unit 8.

If the apparatus is so designed that the user ID and the musical skill level stored in the user registration data storing unit 8 are substantially kept by any means after the operation of the apparatus is terminated, the registered data will be available when the apparatus is restarted. For example, the user registration data storing unit 8 may be designed to keep the data even after the use of the music score display controlling apparatus 2 is finished, or the data in the user registration data storing unit 8 may be written in some backup memory and the backed-up musical skill level data may be transferred back to the user registration data storing unit 8 to keep the data to be used for processing. Then, there will be no need of setting the musical skill level again, as long as there is no change in the user's skill, and the manipulation of the apparatus will be simple and easy for the user. For such a purpose, the user registration data storing unit 8 or the backup memory may preferably be a storage medium such as a hard magnetic disk or may be a non-volatile semiconductor memory such as a battery-backed-up semiconductor memory or a flash memory, which keep the stored data even after the power of the computer system is shut down.

The music score display controlling unit 2 may further comprise a storing unit 9 for a user-set table of musical score items as depicted in broken line in FIG. 1. The music score item selecting unit 6 edits the user-set table of the music score items which are stored in the storing unit 9 by inputting the music score items to be exhibited in correspondence to the user through manipulation of some input devices. Further, the music score item selecting unit 6 reads out the music score items to be exhibited as set according to the user from the storing unit 9 for the user-set table of music score items 9 and selects the music score items to be exhibited to thereby control the music score display data composing unit 3. In case there are plural users who will use the music score display controlling apparatus 2 of the present invention, the user-set tables of music score items may be provided for the respective users individually, and each user is to designate his/her own table of music score items by entering his/her user ID.

In the above description, where the performance data providing unit 1 is a storage unit, the storage unit may constitute a storage unit such as a RAM, a ROM, a semiconductor memory card and a hard disk (HD) equipped within the same personal computer or the same electronic musical instrument together with the music score display controlling apparatus 2. The storage unit may also be a remote storage unit equipped within another server computer or another personal computer which is connected in a communication network. The music performance data are data representing a music piece including event time data under the SMF (Standard MIDI File) protocol or the like.

On the other hand, where the performance data providing unit 1 is a musical keyboard actually played by a user, the performance data are inputted in real time and the time points at which the respective notes constituting the music performance are inputted are the respective event times of the respective notes constituting the music progression. There may be a case in which performance data in real time are supplied in real time via a communication network. If the transmission delay of each data piece is assured constant in the communication network, the received performance data can be handled and processed just like the abovementioned real time performance data from the keyboard play. In case of a communication network of which the data transfer delays are not assured constant, the music performance data may be accompanied by some kind of time defining data as in the case of the abovementioned music piece data. Music performance data may be processed in real time through stream transmission to play back the music performance. The performance data providing unit 1 may include a microphone to pick up the user's singing voices, and the picked-up voices are data-processed to detect the respective tone pitches and then converted to the note data.

The function of composing music score display data based on performance data can be realized in the abovementioned music score display data composing unit 3 by employing the same processing for such a function as utilized in the conventional sequencer program, etc. For example, the inputted performance data are once converted to music score data including notes and other notational elements, which in turn converted to the music score display data for the display device 4. Rests are inserted at time gap positions between respective adjacent notes, as the durations of the respective notes are determined by quantizing each note length. The duration of each rest is determined according to the time gap amount at each time gap position. The pedaling signs will be inputted as a kind of performance data of the control change. In the case of music piece data, the title of the music, the tempo, the meter, the key, the words, etc. are included as meta-events. In some cases, chord data are also included. When there are no chord data included in the performance data, chords can be detected by the chord analysis procedure known in the art.

In the case of a real time performance on the keyboard, some marks or signs should be inputted manually using a keyboard or button switches by the user separately. The performance data will be converted to music score display data by adding other background music score item data such as notations of staffs and clefs. In the case of the real time performance data, the performance data of each event is converted to music score data to create music score data of each event, and the created data pieces are transferred successively to the display device 4. In the case of the music composition (piece) data, the notes and other notations may be displayed successively as in the abovementioned case, or the whole music composition data may be once converted to music score data, and the music score data selected for display may thereafter be converted to music score display data.

In the above description, the music score display data composing unit 3 outputs the composed music score display data to the display device 4. However, the music score display data composing unit 3 may output music score print data to the printer 1, instead. Further, the music score display data composing unit 3 may output the music score display data or the music score print data to the storage unit 11. The printing of a music score is herein considered to be a form (mode) of the displaying of a music score, as the internal structure of the music score display controlling apparatus 2 of FIG. 1 does not vary between the printing and the displaying, but the mere difference resides in that the outputted data are used for the printer 10 in place of the display device 4.

The storage device 11 is to store the composed data as a document file in place of directly displaying the music score display data on the display device 4 or directly printing the music score print data using the printer 10. There may be no clear distinction between the display data file and the print data file, however a BMP (bit map) data file may be classified as a display data file, while the PDF (portable document format) file as used with the application software "Acrobat Reader (TM)" of Adobe Systems Inc. may be classified as a printing data file. The storage unit 11 may be the same storage unit that is included in the performance data providing unit 1. In such a situation, for example, the storage unit 11 will store the data files for the music score display or the music score printing together with the music piece data. The music piece data file and the display/printing data file may be consolidated into a single storage medium, for physical delivery and e-net delivery.

FIG. 2 is a chart showing an example of a table which lists the correspondence between musical skill levels and music score items to be displayed and which is stored in the musical skill level/music score item correspondence table storing unit 7 shown in FIG. 1, as a factory-prepared read-only table. In the table, the leftmost column enumerates musical skill levels in five ranks of A (highest) through E (lowest), in which A means an expert or advanced player and E (lowest) means a novice or beginner. As for the items to be exhibited on the music score, the example of FIG. 2 counts five kinds of items: the chord, the dynamics, the fingering guides, the pedaling instructions and the note namings. In the list, a hollow circle denotes the musical signs and instructions of the captioned item are to be exhibited, while a cross denotes the musical signs and instructions are not to be exhibited. The musical skill level/music score item correspondence table storing unit 7 stores the flags indicating exhibit/non-exhibit conditions in the form of a table of FIG. 2.

FIGS. 3a and 3b are charts, each showing an example of a music score displayed according to a musical skill level. FIG. 3a is a music score corresponding to a relatively high level of musical skill (Level B in FIG. 2). This score includes chord name symbols 21a, 21b and 21c in the chord track, and pedaling instruction symbols 22a, 22b, 22c and 22d in the pedal track, in which the symbols 22a–22c are "Con Pedale" (with pedal) marks meaning to step on (newly or after a momentary release) the sustain pedal of the piano and the symbol 22d is "Senza Pedale" (without pedal) mark meaning to release the sustain pedal. FIG. 3b is a music score corresponding to a relatively low level of musical skill (Level D in FIG. 2). This score includes dynamics signs 23a and 23b, note names 24 and fingering numbers 25 (the numbers 1–5 correspond to the thumb through the little finger, respectively).

FIGS. 4a, 4b and 4c are charts, each showing an example of a table which lists the correspondence between musical skill levels and music score items to be displayed, as a second mode of the table preparation. The tables are stored in the musical skill level/music score item correspondence table storing unit 7 of FIG. 1. In this mode, the musical skills are divided into three specific skill groups, and the tables are prepared separately for the respective skill groups, indicating whether the corresponding score items are to be exhibited or not. According to these examples, the musical skill level/music score item correspondence table storing unit 7 of FIG. 1 includes three tables corresponding to FIGS. 4a–4c, and the exhibit/non-exhibit flags are set (stored) as illustrated in FIGS. 4a–4c in the table storing unit 7.

FIG. 4a is a table with respect to the music playing skill, and indicates whether the signs and instructions of the respective items: dynamics, fingering and pedaling are to be exhibited or not in the displayed music score in accordance with the levels of the music playing skill. FIG. 4b is a table with respect to the music score reading skill, and indicates whether the note names are to be added in the displayed music score in accordance with the levels of the score reading skill. FIG. 4c is a table with respect to the music arranging skill, and indicates whether the chord names are to be described in the displayed music score in accordance with the levels of the music arranging skill. Among the music score items to be exhibited in the music score, there are some more items such as the tempo instruction like "Andante" and the mood instruction in addition to those described above.

FIGS. 5a, 5b and 5c are charts, each showing a specific example of a user-set table which lists the correspondence between the musical skill levels and the music score items to be displayed as stored in the storing unit 9 for user-set tables of the music score items of FIG. 1 to be used as a working table in the data processing. FIG. 5a is a table having the same contents as the musical skill level/music score item correspondence table shown in FIG. 2. This table is provided as a default table (with the factory-set contents) of the user-set table about the music score items to be exhibited in the music score. As described in connection with FIG. 1, when the user directly sets the music score items to be exhibited, the user edits this user-set table by writing flags about exhibit/non-exhibit conditions of the respective music score items with respect to the respective levels.

FIG. 5b is an example of the user-set table illustrating the contents after the user has written the music score items to be exhibited. In this table, the asterisk sign * means the same content is set there as the default table. In order to set the exhibit/non-exhibit condition, the user substitutes either "exhibit" (hollow circle) or "non-exhibit" (cross) flag for the asterisk sign at each intended cell in the table to store the exhibit/non-exhibit flags in the table at storage unit 9 for the user-set table of the music score items. The cell with the asterisk sign contains the same flag as the musical skill level/music score item correspondence table of FIG. 2. The table of FIG. 5b itself is presented here just for the explanation, but may be actually displayed on the display device 4 for the user's edition of the user-set table of the music score items. Alternatively, the user-set table of the music score items for edition by the user may be presented as a default table on the screen with the same contents as the last edited user-set table so that the user can start the edition from such a state making reference to the original table of FIG. 2. In the case of the table containing the exhibit flags (hollow circles) and the non-exhibit flags (crosses), the edited (i.e. changed from the default) flags may preferably be shown in an altered color or on an altered background color so that the user can easily recognize which particular flags have been altered from the default conditions and which are not.

FIG. 5c is another example of the user-set table illustrating the contents after the user has edited the music score items to be exhibited. Generally speaking, a user will not change his/her own musical skill level every time the user uses the apparatus. Under such circumstances, the user-set table with respect to one skill level will suffice for the identified user, and therefore the user may set one skill level from among the five levels so that the row for such a set skill level will be read out from the default table and displayed for the user to edit the exhibit/non-exhibit conditions about the respective music score items to be exhibited. In place of editing the default table, the user may simply set the exhibit/non-exhibit conditions of the individual items according to the user's preference, where the item of the musical skill level may not be shown in the displayed table (blank table). When the music score display controlling apparatus 2 is to be used by plural users, the user identification may be first conducted similarly as the abovementioned musical skill level setting in the case of a single user. The user inputs his/her ID, and when the identified user is a new user, the user-set table of the music score items as shown in FIGS. 5b and 5c may be edited and the edited table may be stored with the user ID attached thereto for later uses by the same user, and when the identified user is a registered user, the user-set table of the music score items for the registered user may be read out for edition.

FIG. 6 is a block diagram illustrating the hardware configuration of an embodiment of an apparatus for controlling music score display according the present invention. Description will be made hereinbelow about an embodiment wherein an application program is installed in a personal computer to realize the function of controlling a music score display. To a bus 31 are connected a CPU (central processing unit) 32, a ROM (read only memory) 33, a RAM (random access memory) 34 and a timer 35. The time 35 counts time for keeping and defining various timing such as interrupt timing. Also connected to the bus 31 is a manipulating device 36 including a keyboard and a mouse for inputting various control operations including music play and computer use. Further connected is a display circuit 37 to drive and control the display device 4 (FIG. 1). A tone generator 38, a D/A converter and a sound system 40 are for producing musical tones. An external storage device 41 is equipped with a hard magnetic disk (HD), a flexible magnetic disk (FD), an optical disk such as a CD-ROM (compact disk read only memory), a semiconductor memory card, or the like. A communication interface 42 is to connect the printer 10 (FIG. 1) to the apparatus. A communication interface 43 is, for example, a MIDI interface to connect an external MIDI apparatus such as an electronic keyboard musical instrument 44.

The music performance data are read out from the external storage device 41 or inputted by the external electronic keyboard musical instrument 45, and transferred to the work area in the RAM 34 for data processing. A communication interface 45 is to connect to a server computer via a communication network 46 including a LAN (local area network), a MAN (metropolitan area network) and a WAN (wide area network) for receiving real-time performance data or inputting performance data as a music piece data file (i.e. for streaming playback or downloading into the memory).

The CPU 32 loads an application program stored in the HD in the external storage device 41 into the RAM 34 under the control by the operating system program, and conducts the music score display control according to the present invention. The music score display control includes selection of the data for the music score display (or the music score printing) to be supplied to the display device 4 or the printer 10 based on the performance date inputted in real time or the performance data obtained by reading out a stored music data file. The music score display control further includes storing the music score display data or the music score printing data into the external storage device 41 and transmitting the data to a server computer or a personal computer connected on the communication network 46 via the communication interface 45 to be stored therein. The program for the music score display may be used by itself, or may be executed as incorporated in a sequencer software program. The program may be supplied by means of a CD-ROM or may be downloaded from a server computer on the communication network 46.

The tone generator 38 generates digital musical tone signals in accordance with the performance data. The generated digital musical tone signals are converted to analog tone signal waveforms through the D/A converter 39, and then supplied to the sound system 40 to be outputted from loudspeakers as audible sounds. While the above-described structure comprises the tone generator circuit 38, the tone generation may be conducted by an external tone generating device to be connected via the communication network 43, or may be conducted by a software tone generator as executed by the CPU 32. The inputting operations of the musical skill level, the user ID, the user-set table edition, the user-set table read-out command are conducted by means of the keyboard and mouse 36.

FIG. 7 is a chart describing the program and the data stored in the RAM 34 of FIG. 6. The storage area 51 in the RAM 34 includes areas for executing programs such as an operating system program and application programs, areas for registers and tables to store data under processing (table area 52, user registration data area 53, etc.) and areas for performance data of music piece A (performance channel area 54). The table area 52 stores the musical skill level/music score item correspondence table as shown in FIG. 2 and FIGS. 4a–4c and the user-set tables about the music score items as shown in FIGS. 5b and 5c, and so forth. In the user registration data area 53, the user-set registration data are stored with respect to the user ID and the musical skill level of each user. These tables and user registration data are stored in the HD (hard disk) or else in the external storage device 41, and will be loaded in the RAM 34 upon activation of the application program for use and modification, and will be stored back in the HD or else at the time the application program is terminated.

The area 54 for the performance data of music piece A stores the performance data consisting of plural MIDI channels and inputted, for example, from the external storage device 41, wherein the performance data are stored channel by channel. Each channel 55 has initial settings, plural sets of a duration and a note data, and end data. The initial settings includes data defining the title, the tempo, the meter (time signature), the key, etc. of the music piece. The duration is the data which represents the lapse of time from the preceding event (performance event). The note data 56 is the data which defines the note by, for example, the note number representing the note pitch or name, the velocity representing the intensity of the tone and the gate time representing the sounding time length of the tone. The note data may be expressed in the form of a set of two event data of the note-on event and the note-off event. In such a case, each duration of the note-on event and the note-off event serves as the timing data in the data string. The format of the adovementioned performance data of the music piece A may be the one which is specific to the sequencer program along with the MIDI protocol or may be a general format of the standard MIDI file (SMF).

The storage area further includes an area for recording the incoming data and stores the MIDI data transmitted from the electronic keyboard musical instrument 44 connected externally. There are also areas for storing the music score items data and the music score display data when the performance data are converted to music score items data, which in turn are converted to the music score display data.

The apparatus illustrated in FIG. 6 is configured by those blocks as described above based on a personal computer. The same or similar function can be realized by an electronic apparatus such as an electronic musical instrument equipped with a CPU using a computer program, although the hardware configuration may be a bit different from FIG. 6. The music score can be displayed on a display screen arranged on the control panel of the apparatus, and can be displayed on a display device or printed by a printer provided at a personal computer connected via the communication interface 43. In a music training class (or school), a teacher's personal computer may be equipped with the function of the music score display control apparatus 2 so that music scores can be printed individually to match the respective musical skill levels of the trainees and given to the individual trainees. Or the teacher can prepare music score display data files or music score printing data files for the respective musical skill levels of the individual trainees, and deliver the storage media containing such files to the respective trainees, or transmit such files to the personal computers or the electronic musical instruments of the respective trainees via the communication network so that the music score to meet the musical skill level of each trainee will be displayed on the display device or printed by the printer at each trainee's side. The service is not necessarily be limited to the music training class, but can be also given to students residing at remote sites via the network of Internet.

The function of the music score display control apparatus 2 may be provided at a server computer on a communication network. Then, as a kind of delivery service, the server computer can receive a request from a remote client, pick up the music data of the requested music piece from the database, create a music score to meet the client's musical skill, and can deliver a printed score or an electronic data file for displaying or printing a music score via the communication network. If necessary, the data file of the music piece can be also delivered. The server computer may be supplied with a data file of a music piece or of an actual music performance from a client via the communication network.

Herein-below will be described an operation of an embodiment of the present invention with respect to the case where a data file of a music piece is read out and then a music score is displayed under the control processing of the present invention. FIGS. 8a, 8b and 8c, in combination, are a flow chart describing the overall flow of the music score display control processing according to an example of the present invention. A step S61 (FIG. 8a) is for inputting initial data. First an initial screen is displayed. Then, the user registration data, the table data and so forth are read out from the HD in the external storage device 41 and are transferred to the RAM 34. Next, a music score window (staff window) is displayed. In case, however, no music piece is selected, only a blank staff with clef signs is displayed. Then, a user identifying window is displayed to let a registered user input his/her ID number and to let a new user click a "new user" button. A step S62 detects whether the "new user" button is clicked, and judges whether the user is a new user or not. If the judgment tells it is a new user, the process proceeds to a step S63, and if the judgment tells it is not a new user, the process skips to a step S64 (FIG. 8b).

The step S63 is for setting the user's musical skill. To determine the levels of the user's musical skill, the tables of FIGS. 4a–4c are displayed on the user identifying window, which let the user select one out of five levels A (highest) through E (lowest) for each of the music playing skill, the score reading skill and the arranging skill. The selected levels are added to the user registration data. The step S64 is for selecting a music piece to be displayed. In the step S64, the user identifying window is closed before letting the user select one device in the performance data providing unit 1. Then the display screen displays a list of music piece data including titles, data sizes, etc. as stored in the selected device in the performance data providing unit 1, and let the user select a desired music piece from the displayed list.

Next, at a step S65, a music score displaying process takes place by a subroutine described in FIG. 9, which is a flow chart describing in detail the subroutine processing for displaying a music score as conducted at the step S65 of FIG. 8. Now referring to FIG. 9, a step S81 judges whether the music score of the selected music is being displayed on the screen. If not being displayed, the process moves forward to a step S82, and if being displayed, the process skips to a step S83. The step S 82 is for converting the performance data to music score data. The performance data of the selected music piece is transferred into the work area of the RAM 34. Then the performance data written in the working area are converted to music score data including note data and necessary signs. The step S83 judges whether the mode of using the user-set table of FIG. 5b or FIG. 5c is selected or not. Illustration of the mode selection flow is omitted for the sake of simplicity. If the judgment is affirmative (YES), the process moves to a step S84, and if negative (NO), the process goes to a step S85.

Where the table of FIG. 5b is used, the step S84 selects the music score items to be exhibited based on the user-set table of the music score items and the user registration data before proceeding to a step S86. Where the table of FIG. 5c is used, the user registration data is unnecessary. The step S85 selects the music score items to be exhibited based on the musical skill level/music score items corresponding table and the user's musical skill data registered in the user registration data before proceeding to the step S86. The step S86 is for displaying the music score. The step S86 creates the music score display data based on the selected musical score items and outputs the created data to the display device 4 to display the music score. Then the processing returns to the routine of the flow in FIG. 8b.

Now back again to FIG. 8b, a step S66 judges whether there is a command for printing. The flow for inputting the print command is omitted here. If the printing is commanded, the process goes to a step S67, and if not commanded, the process skips to a step S68 (FIG. 8c). The step S67 is for creating print data, and creates music score print data based on the music score display data, and transmits the created print data to the printer 10 before the process proceeds to the step S68. The step S68 judges whether there is a command of editing the user-set table of the music score items. The flow for inputting the edit command is omitted here. If the editing is commanded, the process goes to a step S69, and if not commanded, the process skips to a step S70.

The step S69 is for creating a user-set table, and display a window for the user-set table edition to let the user input music score items to be exhibited. After the edition is finished, the step S69 closes the window for the edition, before going to the step S70. The step S70 judges whether there is a command of terminating the music score display control program. If the termination is commanded, the process moves forward to a step S71, and if not, the process goes back to the step S65 (FIG. 8b) for executing the subroutine processing of FIG. 9 for displaying the music score. Under this situation, the music score is already being displayed the process skips from the step S81 to the step S83 in FIG. 9. The step S71 (FIG. 8c) is for storing the user data before ending the program, and writes the present user registration data, the table data, etc. as stored in the RAM 34 into the HD (hard magnetic disk) in the external storage device 41.

The above explanation is made about the case where the performance data which constitute a music piece data are converted as a whole to the music score data for one page or plural pages, but the conversion may be conducted every one or a few pages. Where the music piece is constituted by a plurality of performance parts, each part may be separately displayed or printed from one part to another and also a general consolidated score showing parallel progression of plural parts may be displayed or printed. While the musical skills are classified into the music playing skill, the music score reading skill and the arranging skill in the above description, the musical skills may be classified differently based on the skills from other points of view. The number of levels may be more than five or may be less than five. While the music score items are grouped into the chord, the dynamics, the fingering, the pedaling and the note naming, the music score items may be grouped differently from other points of view, and may be grouped more precisely or more roughly.

In the above-described flow of processing, the user's musical skill levels are inputted by means of the keyboard or mouse 36 on the input screen of the personal computer, and the levels are inputted by abstract level values (A through E). Alternatively, the musical skill levels may be selected by showing specific examples of music pieces and asking which melodies the user can play. Or the musical skill level may be determined by showing some simple music scores to the user and let the user play the score or let the user read the score. The musical skill level setting unit 5 of FIG. 1 can set the level by inputting such a determined level.

In the above-described flow of processing, the music score items to be exhibited are determined immediately after the music score display control program is initiated and usually before the performance data are displayed in a music score. Thus, a music score which meets the user's musical skill level will be displayed from the start of using the apparatus, and the user will not lose his/her will to practice upon seeing the music score to confront, and will start and continue training at the displayed music score. However, the music score items to be exhibited may be rendered selectable by changing the setting of the musical skill, even after the performance data are displayed as a music score.

In the above description, the music score is displayed or printed in association with a personal computer, a server computer and an electronic musical instrument. The present invention is similarly applicable to a karaoke apparatus, a game apparatus, a PDA (personal digital assistant) terminal, a mobile phone terminal, etc. by displaying a music score using the equipped display device or printing a music score using a connected printing device. The apparatus of the present invention may be equipped with a printer, and then the performance data may be supplied to such a printer, which in turn will print out the music score.

As explained hereinabove, the present invention permits the user to select the music score items to be exhibited on the music score in correspondence to the user's musical skill level. An as a result, the user will practice in playing music without losing his/her enthusiasm for practicing upon glancing at the displayed score.

As will be apparent from the description herein above, some of the structural element devices of the present invention are configured by a computer system performing the assigned functions according to the associated programs. They may of course be hardware structured discrete devices. Therefore, a hardware-structured device performing a certain function and a computer-configured device performing the same function should be considered a same-named device or at least an equivalent to each other.

While particular embodiments of the invention have been described, it will, of course, be understood by those skilled in the art that the invention is not limited thereto, since modifications may be made by those skilled in the art without departing from the spirit of the present invention, particularly in light of the foregoing teachings. It should be understood that the embodiments shown in the drawings and described above are merely for illustrative purposes, and are not intended to limit the scope of the invention. It is therefore contemplated by the appended claims to cover any such modifications that incorporate those features of these improvements in the true spirit and scope of the invention.

What is claimed is:

1. A music score display controlling apparatus for composing music score display data according to music performance data, the apparatus comprising:
    a music data providing unit which provides music data representing a music performance;
    a musical skill level input unit for inputting a user's musical skill level; and
    a music score display data composing unit which composes music score display data based on said provided music data to display a music score representing said music performance, said music score display data containing data for exhibiting musical signs and indications of music score item categories which meet said user's musical skill level when included in said displayed music score,
    wherein said music score display data composing unit includes a music score item determining unit which selectively determines said music score item categories of musical signs and indications to be exhibited on a displayed music score according to said inputted user's musical skill level, and controls said music score display data composing unit to compose said music score display data containing data for exhibiting musical signs and indications of said determined music score item categories which meet said user's musical skill level when the music score is displayed.

2. A music score display controlling apparatus comprising:
    a first table storing device which stores a first table containing data of music score item categories to be exhibited on a music score with respect to musical skill levels;
    a musical skill level setting device for setting the musical skill level of a user;
    a music score item determining device which selectively determines music score item categories of musical signs and indications to be exhibited on a displayed music score by reading said music score item categories from said first table storing device according to said set musical skill level of the user; and
    a music score display data composing device which receives music performance data, composes music score display data based on said inputted music performance data containing data for exhibiting musical signs and indications of said music score item categories as determined by said music score item determining device, and outputs said composed music score display data.

3. A music score display controlling apparatus as claimed in claim 2, wherein said music skill levels are levels of at least one of a music playing skill, a music score reading skill and an music arranging skill.

4. A music score display controlling apparatus as claimed in claim 2, further comprising a user registration data storing device;
    wherein said music skill level setting device includes a user identifying device for identifying a user, and when the user is identified as being a new user, said music skill level setting device let said new user input the musical skill level of said new user, sets the inputted musical skill level of said new user, and stores the identification of said new user and said set musical skill level in said user registration data storing device, and when the user is identified as being an already registered user, said music skill level setting device reads out the musical skill level of said registered user from said user registration data storing device and sets said read-out musical skill level.

5. A music score display controlling apparatus as claimed in claim 2, further comprising a second table storing device for storing a second table to contain data of music score item categories to be exhibited on a music score with respect to said user;

wherein said music score item determining device is to input music score item categories of musical signs and indications to be exhibited in the displayed music score with respect to said user and store said inputted music score item categories into said second table storing device, and to read out said stored music score item categories with respect to said user, thereby determining the music score item categories of musical signs and indications to be exhibited in the displayed music score.

6. A music score printing controlling apparatus comprising:

a first table storing device which stores a first table containing data of music score item categories to be printed in a music score with respect to musical skill levels;

a musical skill level setting device for setting the musical skill level of a user;

a music score item determining device which selectively determines music score item categories of musical signs and indications to be exhibited in a printed music score by reading said music score item categories from said first table storing device according to said set musical skill level of the user; and a music score printing data composing device which receives music performance data, composes music score printing data based on said received music performance data containing data for printing musical signs and indications of said music score item categories as determined by said music score item determining device, and outputs said composed music score printing data.

7. A method for controlling music score display according to music performance data, said method comprising:

a step of providing music data representing a music performance;

a step of inputting a user's musical skill level; and a step of composing music score display data based on said provided music data to display a music score representing said music performance, said music score display data containing data for exhibiting musical signs and indications of music score item categories which meet said user's musical skill level when included in said displayed music score, wherein said step of composing music score display data includes a substep of selectively determining said music score item categories of musical signs and indications to be exhibited on a displayed music score according to said inputted user's musical skill level, and a substep of controlling said step of composing said music score display data which contain data for exhibiting musical signs and indications of said determined music score item categories which meet said user's musical skill level when the music score is displayed.

8. A method for controlling music score display according to music performance data, said method comprising:

a step of storing a first table which contains data of music score item categories to be exhibited on a music score with respect to musical skill levels;

a step of setting the musical skill level of a user;

a step of selectively determining music score item categories of musical signs and indications to be exhibited on a displayed music score by reading said music score item categories from said stored first table according to said set musical skill level of the user; and a step of composing music score display data by receiving music performance data, composing music score display data based on said received music performance data which contain data for exhibiting musical signs and indications of said music score item categories as determined by said step of selectively determining music score item categories, and by outputting said composed music score display data.

9. A computer-readable medium storing a computer program containing program instructions executable by a computer associated with a display device for:

providing music data which represent a music performance;

inputting a user's musical skill level;

composing music score display data based on said provided music data to display a music score representing said music performance, said music score display data containing data for exhibiting musical signs and indications of music score item categories which meet said user's musical skill level when included in said displayed music score; and causing said display device to display a music score with said musical signs and instructions based on said composed music score display data, wherein the instruction for composing music score display data include selectively determining said music score item categories of musical signs and indications to be exhibited on a displayed music score according to said inputted user's musical skill level, and controlling composing of said music score display data which contain data for exhibiting musical signs and indications of said determined music score item categories which meet said user's musical skill level when the music score is displayed.

10. A computer-readable medium storing a computer program containing program instructions executable by a computer associated with a display device for:

storing a first table which contains data of music score item categories to be exhibited on a music score with respect to musical skill levels;

setting the musical skill level of a user;

selectively determining music score item categories of musical signs and indications to be exhibited on a displayed music score by reading said music score item categories from said stored first table according to said set musical skill level of the user; and composing music score display data by receiving music performance data, composing music score display data based on said received music performance data which contain data for exhibiting musical signs and indications of said music score item categories as determined by the instruction for selectively determining music score item categories, and by outputting said composed music score display data, thereby causing said display device to display a music score with said musical signs and instructions based on said composed music score display data.

* * * * *